(12) United States Patent
Doepke et al.

(10) Patent No.: US 8,902,335 B2
(45) Date of Patent: Dec. 2, 2014

(54) IMAGE BLENDING OPERATIONS

(75) Inventors: Frank Doepke, San Jose, CA (US);
Marius Tico, Mountain View, CA (US);
Marco Zuliani, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/489,950

(22) Filed: Jun. 6, 2012

(65) Prior Publication Data
US 2013/0329071 A1 Dec. 12, 2013

(51) Int. Cl.
H04N 5/262 (2006.01)
H04N 5/232 (2006.01)
H04N 7/00 (2011.01)

(52) U.S. Cl.
USPC .......................... 348/239; 348/218.1; 348/36

(58) Field of Classification Search
CPC ...................................................... H04N 5/228
USPC ............ 348/36–39, 239, 218.1; 382/284, 294
See application file for complete search history.

(56) References Cited

U.S. PATENT DOCUMENTS

| | | | |
|---|---|---|---|
| 6,094,215 A | 7/2000 | Sundahl | |
| 6,243,103 B1 * | 6/2001 | Takiguchi et al. | 345/634 |
| 6,304,284 B1 | 10/2001 | Dunton | |
| 6,978,052 B2 | 12/2005 | Beged-Dov | |
| 7,006,124 B2 | 2/2006 | Peleg | |
| 7,409,105 B2 | 8/2008 | Jin | |
| 7,424,218 B2 | 9/2008 | Baudisch | |
| 7,460,730 B2 | 12/2008 | Pal | |
| 7,577,314 B2 | 8/2009 | Zhou | |
| 7,590,335 B2 | 9/2009 | Kobayashi | |
| 7,627,225 B2 | 12/2009 | Shimosato | |
| 7,656,428 B2 | 2/2010 | Trutna | |
| 7,656,429 B2 | 2/2010 | Larson | |

(Continued)

FOREIGN PATENT DOCUMENTS

EP 0592136 4/1994
EP 1940152 A2 12/2006

(Continued)

OTHER PUBLICATIONS

Cha, Joon-Hyuk, et al., "Seamless and Fast Panoramic Image Stitching," 2012 IEEE International Conference on Consumer Electronics (ICCE), pp. 29-30.

(Continued)

Primary Examiner — Nhan T Tran
Assistant Examiner — Chan Nguyen
(74) Attorney, Agent, or Firm — Wong, Cabello, Lutsch, Rutherford & Brucculeri LLP

(57) ABSTRACT

Procedures are described for blending images in real-time that avoid ghosting artifacts (attributable to moving objects), maintain the proper appearance of contiguous edges in the final image, and permits the use of fast (real-time) blending operations. A "guard-band" may be defined around an initially identified seam that perturbs the path of the initial seam so that both the seam and the guard-band's edges avoid moving objects by at least a specified amount. Rapid blend operations may then be performed in the region demarcated by the guard-band. The seam may be further adjusted to bias its position toward a specified trajectory within the overlap region when there is no moving object present. If visual registration techniques are not able to provide a properly aligned overlap region, motion sensor data for the image capture device, may be used instead to facilitate blending operations.

38 Claims, 9 Drawing Sheets

(56) References Cited

U.S. PATENT DOCUMENTS

| | | |
|---|---|---|
| 7,746,404 B2 | 6/2010 | Deng |
| 7,796,871 B2 | 9/2010 | Park |
| 7,844,130 B2 | 11/2010 | Dong |
| 7,912,337 B2 | 3/2011 | Souchard |
| 1,310,987 A1 | 5/2011 | Bhogal |
| 1,310,988 A1 | 5/2011 | Doepke |
| 1,310,994 A1 | 5/2011 | Doepke |
| 1,315,114 A1 | 6/2011 | Doepke |
| 8,121,809 B2 | 2/2012 | Mealy |
| 1,348,995 A1 | 6/2012 | Tico |
| 1,349,018 A1 | 6/2012 | Tico |
| 8,285,079 B2 | 10/2012 | Robertson |
| 8,310,522 B2 | 11/2012 | Jeong |
| 8,379,054 B2 * | 2/2013 | Katayama et al. ............ 345/629 |
| 1,391,124 A1 | 6/2013 | Doepke |
| 2004/0155968 A1 | 8/2004 | Cheatle |
| 2004/0201705 A1 | 10/2004 | Lin |
| 2005/0168593 A1 | 8/2005 | Akizuki |
| 2006/0114363 A1 | 6/2006 | Kang |
| 2006/0115181 A1 | 6/2006 | Deng |
| 2006/0215930 A1 | 9/2006 | Terui |
| 2006/0224997 A1 | 10/2006 | Wong |
| 2006/0268130 A1 | 11/2006 | Williams |
| 2007/0019882 A1 | 1/2007 | Tanaka |
| 2007/0025723 A1 | 2/2007 | Baudisch |
| 2007/0081081 A1 | 4/2007 | Cheng |
| 2007/0097266 A1 | 5/2007 | Souchard |
| 2007/0236513 A1 | 10/2007 | Hedenstroem |
| 2007/0237421 A1 | 10/2007 | Luo |
| 2007/0258656 A1 | 11/2007 | Aarabi |
| 2008/0056612 A1 | 3/2008 | Park |
| 2009/0021576 A1 | 1/2009 | Linder |
| 2009/0058989 A1 | 3/2009 | Kim |
| 2009/0208062 A1 | 8/2009 | Sorek |
| 2009/0231447 A1 | 9/2009 | Paik |
| 2009/0244404 A1 | 10/2009 | Park |
| 2010/0053303 A1 | 3/2010 | Hayashi |
| 2010/0054628 A1 | 3/2010 | Levy |
| 2010/0097442 A1 * | 4/2010 | Lablans ............ 348/36 |
| 2010/0141737 A1 | 6/2010 | Li |
| 2010/0188579 A1 | 7/2010 | Friedman |
| 2010/0309336 A1 | 12/2010 | Brunner |
| 2010/0328512 A1 | 12/2010 | Davidovici |
| 2011/0043604 A1 | 2/2011 | Peleg |
| 2011/0058015 A1 | 3/2011 | Moriyama |
| 2011/0110605 A1 | 5/2011 | Cheong |
| 2011/0116767 A1 | 5/2011 | Souchard |
| 2011/0141300 A1 | 6/2011 | Stec |
| 2011/0157386 A1 | 6/2011 | Ishii |
| 2011/0234750 A1 | 9/2011 | Lai |
| 2011/0304688 A1 | 12/2011 | Ge |
| 2012/0133639 A1 | 5/2012 | Kopf |
| 2012/0263397 A1 * | 10/2012 | Kimura ............ 382/284 |
| 2012/0314945 A1 | 12/2012 | Cha |
| 2013/0004100 A1 | 1/2013 | Putraya |
| 2013/0033568 A1 | 2/2013 | Kim |
| 2013/0063555 A1 | 3/2013 | Matsumoto |
| 2013/0236122 A1 * | 9/2013 | Drouot ............ 382/284 |

FOREIGN PATENT DOCUMENTS

| | | |
|---|---|---|
| EP | 2018049 A2 | 1/2009 |
| WO | 9951027 A1 | 10/1999 |
| WO | 2004049257 A2 | 6/2004 |
| WO | 2006048875 A2 | 5/2006 |
| WO | 2009094661 | 7/2009 |
| WO | 2010025309 A1 | 3/2010 |

OTHER PUBLICATIONS

Methods of Adaptive Image Blending and Artifacts Masking for Panorama Creation. Apple. Inc. Camera Algorithm Team. Technical Report TR-2012-001.

Yingen Xiong and Kari Pulli, "Fast Panorama Stitching for High-Quality Panoramic Images on Mobile Phones," IEEE Transactions on Consumer Electronics, vol. 56, pp. 298-306 (2010).

Efros, Alexei. "Image Blending and Compositing." Computational Photography, CMU, Fall 2010. pp. 1-82.

Levin, Anat, Assaf Zomet, Shmuel Peleg and Yair Weiss. "Seamless Image Stitching in the Gradient Domain." Proc. of the European Conference on Computer Vision (ECCV). Prague. May 2004. pp. 1-12.

"Rendering by Manifold Hopping." Submitted to Siggraph '2001, Paper No. 194, Catgory: research. pp. 1-10.

McCann, James, Nancy S. Pollard. "Real-Time Gradient-Domain Painting." Computer Science Department. http://repository.cmu.edu/compsci/1257.

Perez, Patrick, Michel Gangnet, Andrew Blake. "Poisson Image Editing." Microsoft Research UK. 2003 AMC 0730-0301/03/0700-0313. pp. 313-318.

'Panoramic Image Projections', http://www.cambridgeincolour.com/tutorials/image-projections.htm, 9 pages, May 12, 2011.

'Photo Stitching Digital Panoramas', http://www.cambridgeincolour.com/tutorials/digital-panoramas.htm, 11 pages, May 12, 2011.

'Using Photo Stitching Software', http://www.cambridgeincolour.com/tutorials/photo-stitching-software.htm, 9 pages, May 12, 2011.

International Search Report and Search Opinion for PCT Application No. PCT/US2012/033010, Dated Jun. 19, 2012, 9 pages.

Joshi, Neei, et al., 'Image Deblurring using Inertial Measurement Sensors', ACM SIGGRAPH, New York, NY, 8 pages, Jul. 2010.

PCT Search Report and Search Opinion for PCT Application No. PCT/US2012/034625, dated Jul. 31, 2012, 10 pages.

* cited by examiner

IMAGE BLENDING OPERATIONS

BACKGROUND

This disclosure relates generally to the field of image processing and, more particularly, to various blending techniques for use in generating wide area-of-view images.

One conventional method to generate a wide area-of-view image from a sequence of images (frames) is illustrated in FIG. 1. To begin, a sequence of frames is captured (block 100); frames 1 through 3. The frames are then registered (block 105), identifying the regions of overlap between successive frames (region 110 between frames 1 and 2, and region 115 between frames 2 and 3). Once regions 110 and 115 have been specified, a path or seam is identified through each region (block 120). Here, seam 125 through region 110 and seam 130 through region 115. In accordance with standard scene-cut algorithms, seams 125 and 130 are generally selected to pass through the most similar pixels between each image found in their respective overlap region (i.e., frames 1 and 2 in region 125 and frames 2 and 3 in region 130). As a result, seams 125 and 130 are typically placed outside of, but immediately adjacent to, moving objects within the respective overlap region. With seams 125 and 130 identified, a blend operation across each is performed (block 135); the result of which is final wide area-of-view image 140.

The role of blending operation 135 is to mask or obfuscate the differences between two images. A standard approach to do this uses a process known as "Gradient Domain" blending. Gradient domain blending consists of constructing the gradient field of final image 140 by copying the gradient fields of each image on the corresponding sides of the identified seam (e.g., referring to identifier 145, the gradient fields across seam 125 would be gradient field A from frame 1 and gradient field B from frame 2). Once this is done, the final image is generated by integrating over the gradients across the seam. One popular approach using this technique requires solving Poisson partial differential equations. Reconstructing a final wide angle-of-view image from its gradient field requires substantial computational resources; resources that do not permit the real-time generation of such images on common hand-held devices such as, for example, personal electronic devices having embedded image sensors such as mobile telephones, personal music players, tablet computer systems, and personal gaming devices

SUMMARY

In one embodiment the inventive concept provides a method to blend two images. The method includes identifying an initial seam through an overlap region between first and second images. The seam may be adjusted to incorporate a guard-band area to each of two sides of the seam. More particularly, the guard-band acts to move the initial seam at least a specified distance from a moving object captured in the overlap region. Pixels from each of the two images corresponding to each location of the guard-band may be blended using a real-time blend operation. The resulting blend may be combined with unblended portions of the two images to form a final image. In another embodiment, the seam may be further adjusted to bias the seam's final location at a point toward the overlap region's centerline when there is no moving object present in the area of the overlap region at, or near, the point. In still another embodiment, continuity constraints may be applied to the seam to ensure a higher quality output image. In yet another embodiment, if it is determined that the quality of the overlap operation is unacceptable, seam selection operations may be forgone using, instead, motion sensor output to align the two images (e.g., from accelerometer and/or gyroscopic sensors), where after an alpha-blend (or other fast blend operation) may be performed across the entire overlap region. The described methods may be implemented in hardware, as software (for execution by a processor), or a combination of hardware and software.

DETAILED DESCRIPTION

This disclosure pertains to systems, methods, and computer readable media for blending high-aspect ratio images in real-time to generate wide area-of-view pictures using novel seam selection techniques. As used here, the term "real-time" means during a time that is commensurate with the act of capturing the images. In general, novel seam selection procedures are described that avoid generating ghosting artifacts in the final image (attributable to moving objects), maintain the proper appearance of contiguous edges in the final image (by maintaining a suitable cylindrical projection approximation), and permits the use of fast (real-time) blending operations. More particularly, a "guard band" may be defined around an initially identified seam that perturbs the path of the initial seam so that both the seam and the guard-band's edges avoid moving objects. Rapid blend operations may then be performed in the region demarcated by the guard-band. This can avoid the introduction of ghosting artifacts in the final picture. The seam may be further adjusted to bias its position toward a specified trajectory within the overlap region when there is no moving object present. This can maintain the proper appearance of contiguous edges appearing in the visual scene in the final picture.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

Figure 1:
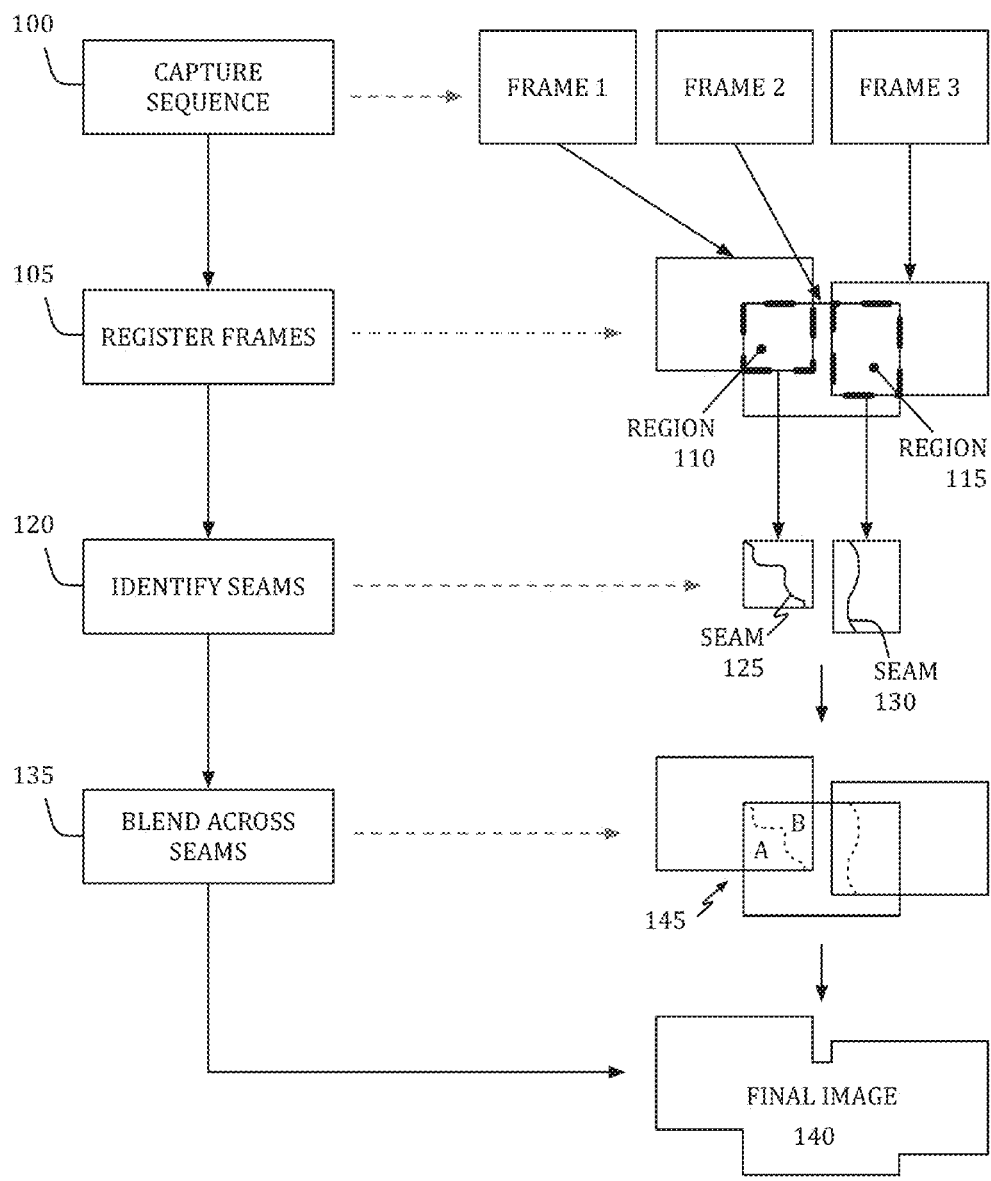
FIG. 1 shows, in flowchart and block diagram form, a wide area-of-view image generation operation in accordance with the prior art.
Figure 2:
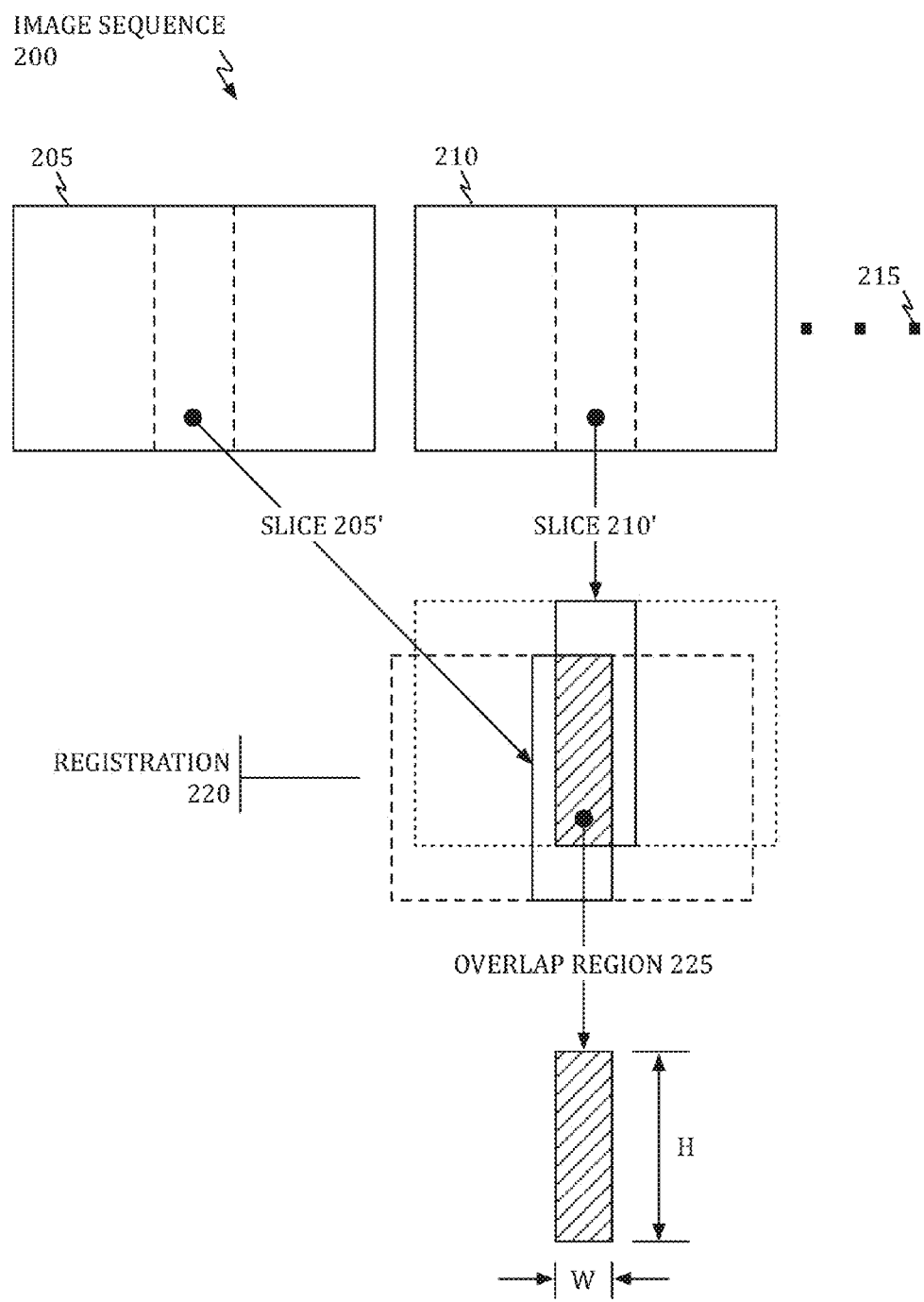
FIG. 2 shows, in block diagram form, identification of an overlap region in accordance with one embodiment.

Referring to FIG. 2, image sequence 200 includes full-size frame 205, full-size frame 210, and zero or more additional frames (designated by ellipse 215). In one embodiment, thin strips may be identified in each frame (e.g., slices 205' and 210') and used during registration operation 220 (which may include, for example, rotation, scaling, translation, affine and fully projective operations, or combinations thereof). As part of registration operation 220, overlap region 225 may be identified. To simplify the following, it is assumed that overlap region 225 is a rectangular area having a height of H pixels and a width of W pixels. Full size frames 205-215 may be substantially any size. For example, an implementation for image capture devices providing 5 Mpix full-size images (having a width of 1956 pixels and a height of 2592 pixels), may use a slice that is 240-by-2592 pixels. In like fashion, implementations using a 2 Mpix image capture device (providing images having a width of 1200 pixels and a height of 1600 pixels), may use a slice that is 200-by-1600 pixels.

It will be understood that when generating wide area-of-view images, the surrounding scene may be captured as it would be projected onto an imaginary cylindrical manifold. As such, the individual frames forming the wide area-of-view image must be projected onto this cylindrical manifold before being blended into the final image. Thus, while the precise dimensions of a slice are unimportant (e.g., 205' or 210'), in some embodiments it may be significant that the slice is much larger in one dimension (e.g., height) than it is in the other dimension (e.g., width). In embodiments in which this holds, the slices may be concatenated to approximate the cylindrical projection of the captured frames. By doing this, cylindrical warping operations may be avoided (a computationally intensive process necessary to compensate for image distortions when large slices or whole frames are registered in accordance with the prior art).

Figure 3:
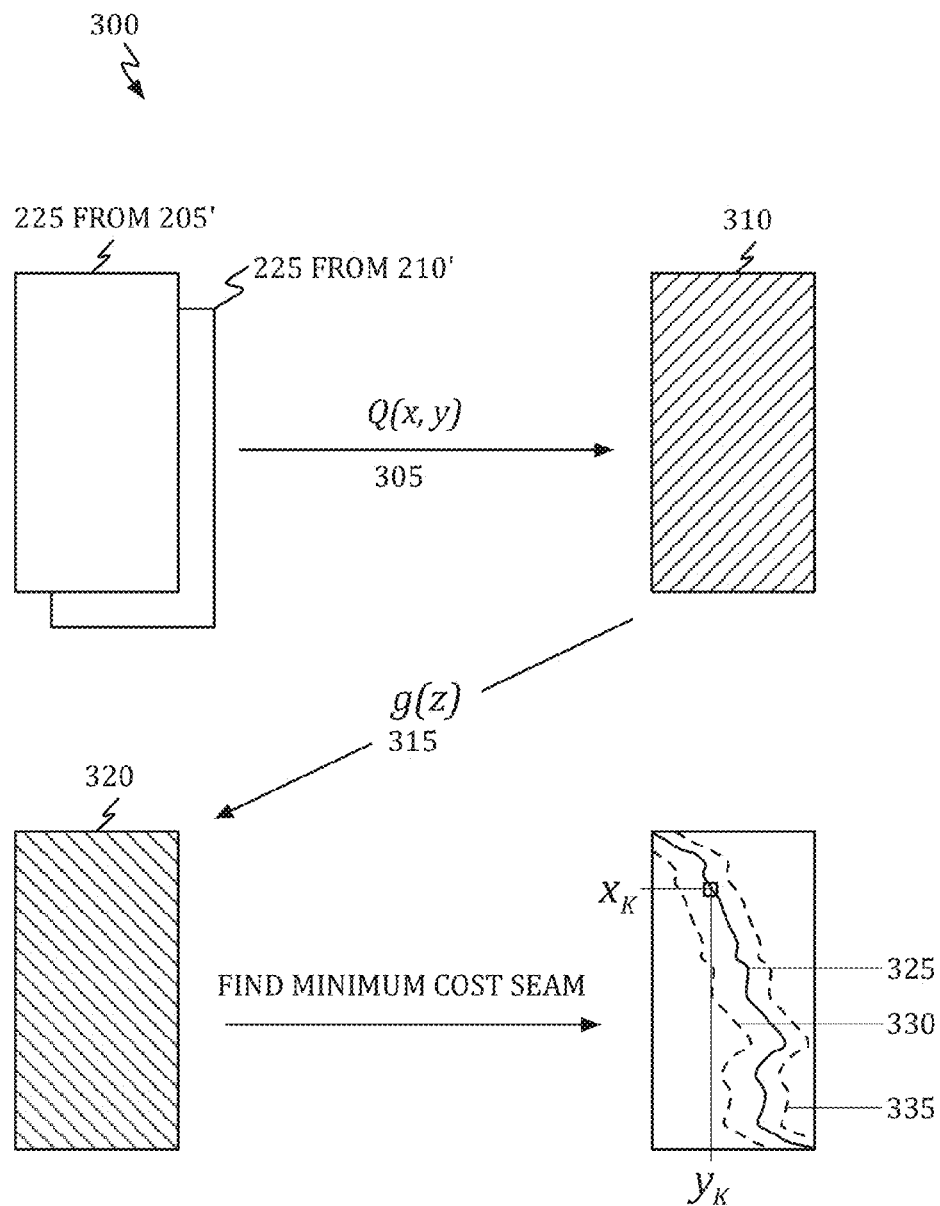
FIG. 3 shows, symbolically, a blend operation in accordance with one embodiment.

Referring to FIG. 3, blend operation 300 in accordance with one embodiment obtains the overlap regions' pixel values for each of the slices that have been registered—205' and 210'. In one embodiment, the values may be luminance values. In another embodiment, the values may represent chroma values (e.g., CbCr or RGB). A cost value Q(x, y) 305 may be assigned to every pixel (x,y) in overlap region 225, where x $\in \{0, 1, 2, \ldots W-1\}$ and y$\in \{0, 1, 2, \ldots H-1\}$. Cost value Q(x, y) may be thought of as expressing the penalty incurred by the seam passing through that pixel. For instance, Q(x, y) may represent the difference between the color values of the two overlapping pixels in the two slices (on a component-by-component basis or as a combined vector descriptor). Cost Q(x, y) may also represent the absolute difference in the luminance values of the two overlapping pixels in the two slices. While the specific measure Q(x, y) used may vary from one implementation to another, it is generally true that the larger the value of Q(x, y), the more likely the pixels in each slice corresponding to the overlap element at (x,y) are associated with different objects, and hence the seam should not pass through that pixel.

When applied to each corresponding pair of pixels (e.g., pixel 'a' in overlap region 225 from slice 205' and the corresponding pixel from slice 210'), the result may be cost map 310. Cost map 310 may be filtered via function g(z) 315 to produce filtered cost map 320. In general, filter g(z) 315 may be used to perturb an otherwise standard path (using, for example, scene-cut techniques) through overlap region 225 so as to introduce a guard-band. More specifically, filter g(z) 315 may be used to place a higher cost on pixels that are close to an object. This has the effect of "pushing the seam away from objects" within overlap region 225. In practice, each of cost function Q(x, y) 305 and filter g(z) 315 may be normalized. That is, the sum of their coefficients may be adjusted to equal one (1).

Figure 4A:
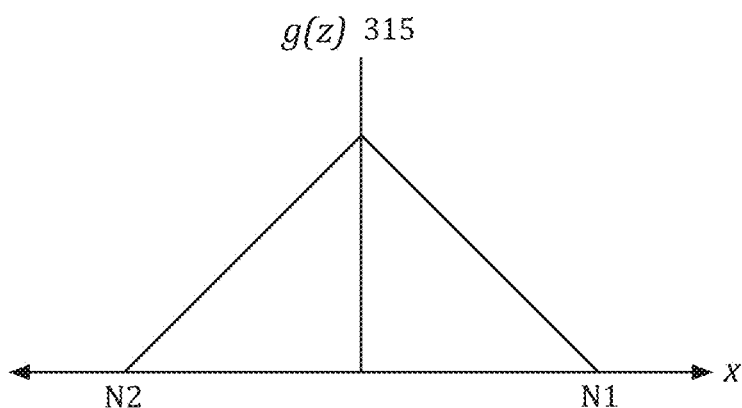
FIGS. 4A-4C show guard-band filter functions in accordance with various embodiments.
Figure 4B:
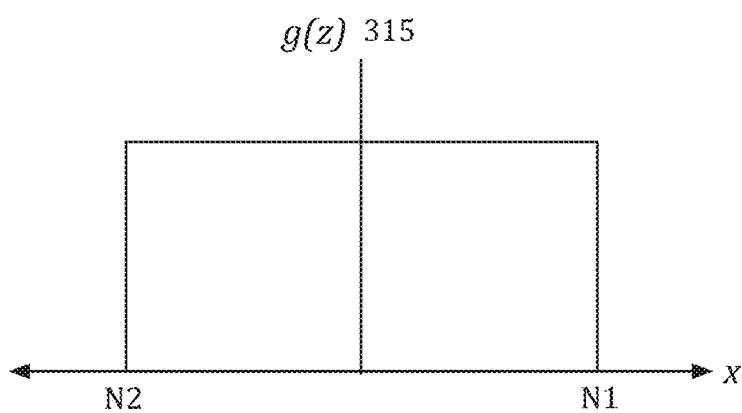
Figure 4C:
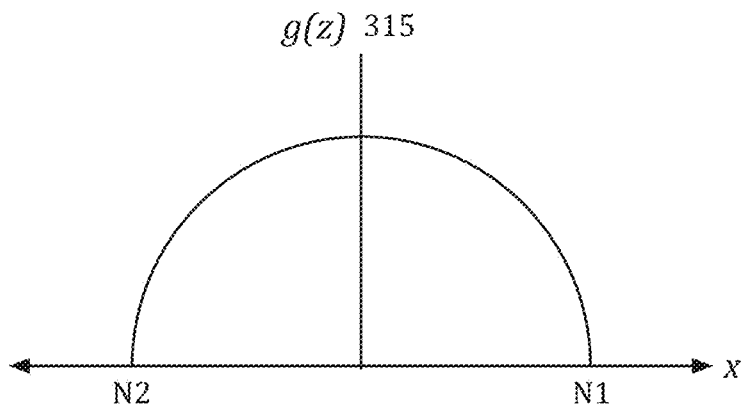

By way of example, and not limitation, FIGS. 4A-4C illustrate various filters g(z) 315 that may be used in generating filtered cost map 320. While the precise shape of filter g(z) is relatively unimportant, the values N1 and N2 represent the width of the applied guard-band. In an embodiment based on 5 Mpix images, a guard-band between 32 and 64 pixels has been found useful. It is noted that while values N1 and N2 have been illustrated as symmetric about a central axis in FIGS. 4A-4C, this is not necessary. Depending upon the needs of a particular implementation, a guard-band may be asymmetric about a central seam.

Once modified cost map 320 has been determined, a minimum cost for a path or seam that traverses overlap region 225 from top to bottom may be determined as follows:

$$\text{Cost} = \min\left(\sum_{k=0}^{K-1} Q(x_k, y_k)\right), \quad \text{EQ. 1}$$

where $(x_k, y_k)$ represents the coordinates of the k-th seam pixel, and K represents the number of pixels in the seam. Resulting seam 325 represents a path through overlap region 225. Application of filter g(z) 315 acts to create guard-band boundaries 330 and 335.

To ensure a continuous or near continuous seam, the number of pixels seam 325 may skip between two consecutive points may be limited to some specified value. For example, assuming that at row $x_k$ seam 325 passes through the point $(x_k, y_k)$, in the next row (row $x_{k+1}$), it may be restricted so that it may only pass through one of the points:

$$((x_{k+1}, y_k-L), (x_{k+1}, y_k-L+1), \square (x_{k+1}, y_k+L)), \quad \text{EQ. 2}$$

where L represents the maximum permitted discontinuity between consecutive pixels along seam 325. L may typically take on some small number such as, for example, 1, 2, 3, ....

When both a minimum cost and continuity constraints are placed on finding seam 325, the cost of seam 325 up to the k-th point may be given by:

$$\text{Cost}_k = \min_{i \in \{-L \ldots L\}} \{C_{k-1} + Q(x_k, y_{k-1} + i)\}. \qquad \text{EQ. 3}$$

With both the minimum cost seam (e.g., seam 325) and guardband boundaries known (e.g., boundaries 330 and 335), each pixel from slice 205' and its corresponding pixel in slice 210' that are along a row in overlap region 225 and between guardband boundaries 330 and 335 may be blended on a pixel-by-pixel basis. Illustrative blending operations include, but are not limited to, alpha blending, dissolve blending, multiply and screen type blending, dodge and burn type blending, arithmetic blending, Boolean blending, and hue, saturation and luminosity blending. These blends may be performed in real-time (no gradient reconstruction is required).

In summary, the embodiments disclosed above register and blend images using regions defined by overlapping thin strips (aka slices) extracted from each frame. It is further noted that various embodiments of blend operation 300 may be performed in real-time. These results are both novel and unexpected, especially since it has been recognized in the field of image processing that optimal seam selection algorithms are not generally appropriate when thin strips are taken from the input images as in the case of blend operation 300. (See A. Levin, A. Zomet, S. Peleg, and Y. Weiss, *Seamless Image Stitching in the Gradient Domain*, Proc. of the European Conference on Computer Vision (ECCV), Prague, May 2004).

Because some embodiments use only thin slices from each frame, it is highly likely that objects in the scene will span multiple slices. In particular, long, straight objects such as wires, bars and the like may span tens of slices (or more). Maintaining the continuity of these types of objects in the final image is important for providing high quality results. The very use of thin slices, however, make this difficult.

Figure 5:
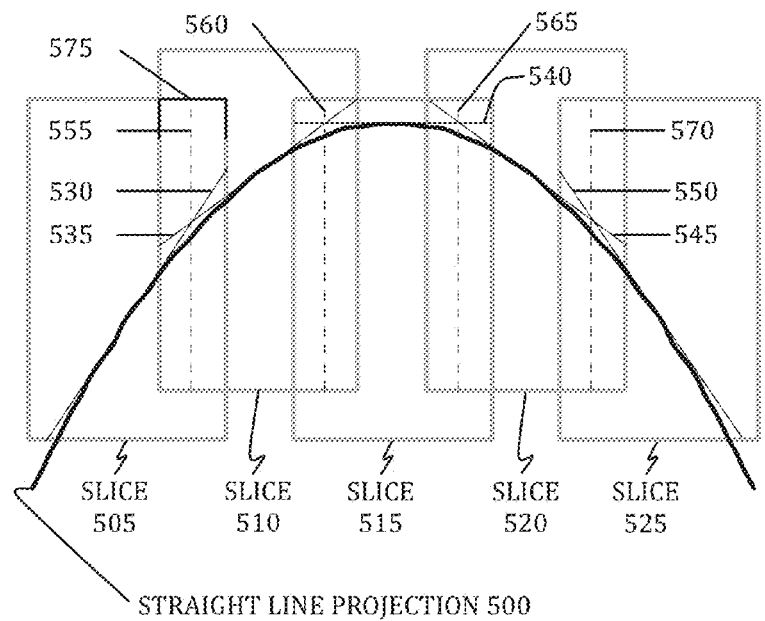
FIG. 5 illustrates, in one embodiment, the cylindrical projection of a continuous horizontal line in the scene.

Referring to FIG. 5, in the case of a perfect cylindrical projection, a contiguous horizontal line from a scene becomes curve 500 in the final image. As shown, each slice 505-525 represents its own part of curve 500 as a straight line (e.g., 530-550). The mismatch between each slice's straight line approximation and the corresponding continuous projection 500 can cause the final image to display the line as a discontinuous series of line segments. For the case where a single continuous horizontal line from the scene is captured for a wide area-of-view image, dashed lines 555-570 represent the "best" seams since they maintain continuity between the individual line segments making up the cylindrical projection of continuous curve 500. Selecting any different seam position will result in a representation where the continuous line in the scene is presented in the final image as an interrupted line. This recognition would seem to suggest that a correct cylindrical approximation may be obtained by always selecting the best vertical seam between two consecutive slices (frames). This approach fails to consider, however, the fact that a scene may contain lines at any orientation, and that always selecting a vertical line (e.g., 555) through an overlap region (e.g., 575) may result in the seam passing through a moving object.

As previously discussed, seams that pass through, or are placed immediately adjacent to, a moving object can result in ghosting artifacts in the final image. Scene-cut approaches attempt to avoid this problem by selecting seams that are continuous paths and which go around moving objects and other areas where the two images are different. One novel embodiment of this approach is described above (e.g., see FIG. 3 and related discussion). Scene-cut is generally applied only to input images or slices after they have been warped to the final projective manifold (e.g., a cylindrical manifold). If the input slices are not so warped, approximation of a cylindrical projection through narrow planar slices can be damaged because the identified seams are based solely on scene content without any consideration being given to achieving a correct cylindrical projection. In other words, by directly applying conventional scene-cut techniques, a line in the scene may become an interrupted line in the final image.

Figure 6A:
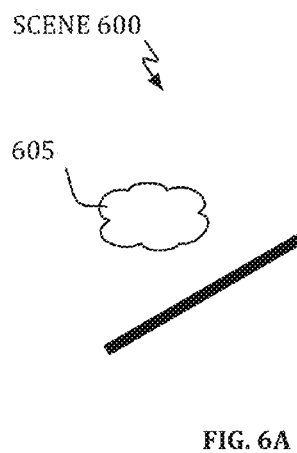
FIGS. 6A and 6B illustrate how a continuous line in a scene may be represented as an interrupted or disjoint line in the final image.
Figure 6B:
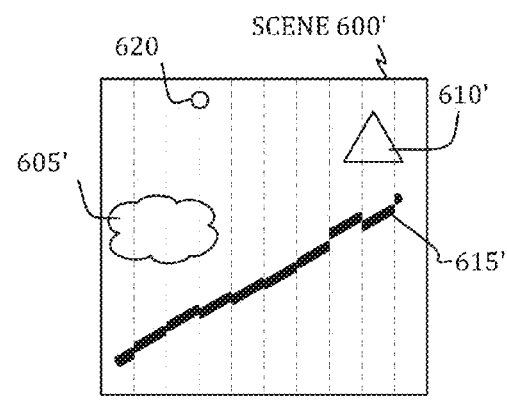

Referring to FIG. 6A, scene 600 may consist of objects 605, 610 and line 615. Referring to FIG. 6B, representation of scene 600 in final wide area-of-view image 600' has elements 605' and 610' corresponding to and representing objects 605 and 610. Line representation 615' shows discontinuities at slice boundaries (illustrated by light vertical dotted lines 620) that may result from ill-advised seam selection as discussed above.

In one embodiment, these difficulties may be tempered by selecting a seam based on both the image content (e.g., in accordance with FIG. 3) and the need to achieve a good cylindrical approximation. The approach described here will be referred to as a "Biased Scene-Cut" technique. In describing the Biased Scene-Cut approach, the notation introduced in FIGS. 2 and 3 and EQS. 1-3 is adopted here. It is noted that, in one embodiment, filter g(z) 315 may be a unity function. That is, filter g(z) 315 may leave cost map 310 unchanged.

Given a pixel (x, y) in overlap region 225, let $(x^1, y^1)$ represent the coordinates of that pixel in first image $I_1$, and $(x^2, y^2)$ represent the coordinates of the corresponding pixel in second image $I_2$. In one embodiment, Biased Seam-Cut cost function $Q_b(x, y)$ may then be represented as:

$$Q_b(x,y) = B(x) \times h(I_1(x^1,y^1), I_2(x^2,y^2)), \qquad \text{EQ. 4}$$

where $h(I_1, I_2)$ may represent a distance measure between pixel values, and B(x) represents a function that biases the shape of the cost function $Q_b(x, y)$ toward a minimum value along a vertical axis passing through the middle of the overlap region (e.g., region 225). As illustrated in FIG. 5, this tends to preserve the quality of the final image's cylindrical projection and an improved representation therein of continuous lines. In one embodiment, distance function h( ) could be a Euclidean distance between the colors of the two overlapping pixels, $(x^1, y^1)$ and $(x^2, y^2)$. In another embodiment, function h( ) could be the absolute difference (or difference squared) between the luminance of pixel $(x^1, y^1)$ and the luminance of pixel $(x^2, y^2)$.

In one embodiment, function B(x) can be:

$$B(x) = 0.1 + \left(x - \frac{W}{2}\right)^2, \text{ for } x \in 0 \square \ W - 1. \qquad \text{EQ. 5}$$

Figure 7A:
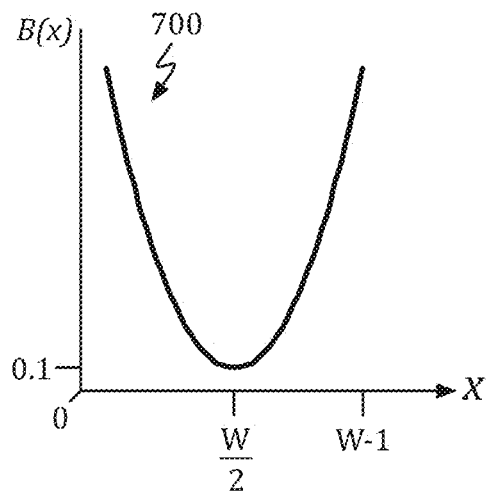
FIGS. 7A and 7B illustrate a cost bias function in accordance with one embodiment.
Figure 7B:
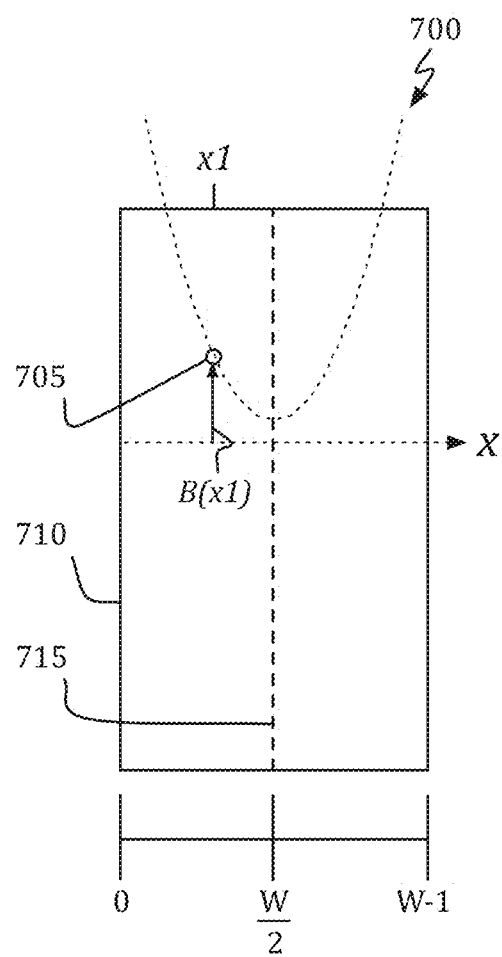

Referring to FIG. 7A, it can be seen that B(x) 700 adds the least amount of cost (0.1 in accordance with EQ. 5) when the pixels being evaluated lie on the overlap region's centerline (i.e., at a location W/2). As the pixels move away from the centerline, the cost increases. This is illustrated in FIG. 7B, which shows cost bias function B(x) 700 applied to pixel location 705 (at position x1) being assigned a value B(x1). As can be seen, this cost may increase significantly the further the location x1 is from overlap region 710's centerline 715.

Accordingly, when overlapping pixels are similar in accordance with function h( )—meaning that function h( ) returns a small value which, in turn, means there is no moving object present—function B(x) can significantly push up the overall cost the further the overlapping pixels are from the overlap region's centerline. This makes it more likely that the minimum cost seam through the location being evaluated is toward the centerline (where B( ) contributes less). It should be recognized that while function B(x) has been discussed in terms of quadratic function 700, this form is not necessary. Substantially any functional relationship may be used including, but not limited to, linear, exponential, and spines. In general, any function that introduces more cost the further the selected location is from the overlap region's centerline may be useful.

Figure 8:
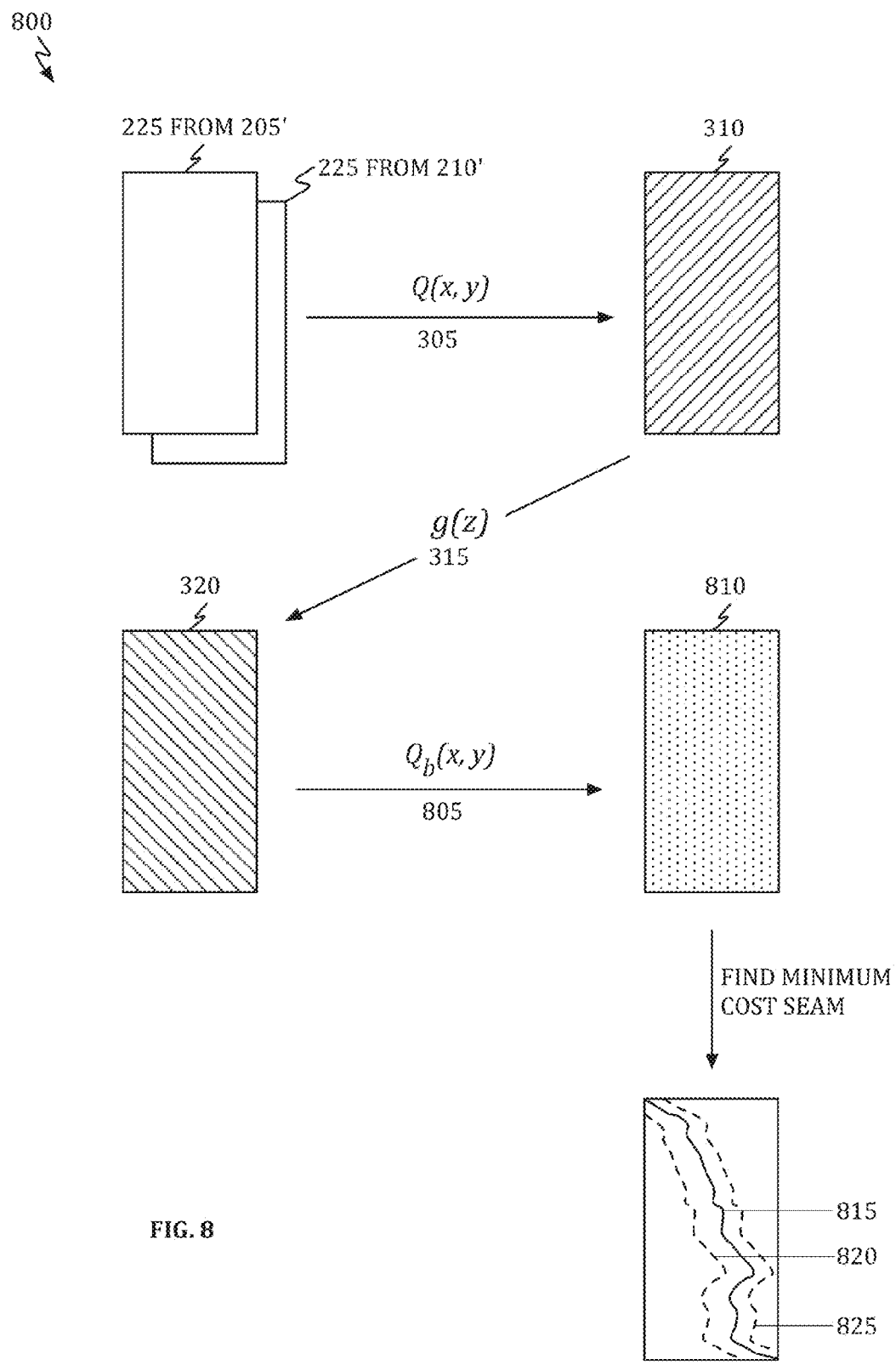
FIG. 8 shows, symbolically, a blend operation in accordance with another embodiment.

Referring to FIG. 8, blend operation 800 in accordance with EQS. 1-5 is shown schematically. In illustrated operation 800, action 305, and 315 may be used to generate modified cost mast 320. Biased Seam-Cut cost function $Q_b(x, y)$ 805 may be applied to generate final cost map 810 which may then be interrogated to identify minimum cost seam 815. If filter g(z) 315 is not the unity function, guard-band boundaries 820 and 825 may also be defined. As was the case with cost function Q(x, y) 305 and filter g(z) 315, Biased Seam-Cut cost function $Q_b(x, y)$ 805 (essentially a filter) may be normalized.

In another embodiment, blending operations employing either or both approaches described above may be used in conjunction with a registration quality measure. In one such embodiment, when overlap region 225 is identified a metric indicating the quality of the registration that yielded the overlap may be obtained. If this metric indicates the registration is "good enough" (e.g., the metric is above a specified threshold), operation 300 may proceed. If the metric indicates the registration is not good enough, visual blending operations may not return quality blending results. In this case, device sensor output may be used to estimate the device's translation. This information may then be used to register the two images and identify the overlap region. Because of the uncertainty introduced by the use of sensor output, it has been found that operations 300 ad 800 do not necessarily return better results than an alpha-blend. In one embodiment an alpha-blend may be applied across the entire overlap region. In another embodiment, an alpha-blend may be applied in the neighborhood of a vertical seam passing through the overlap region's centerline.

Figure 9:
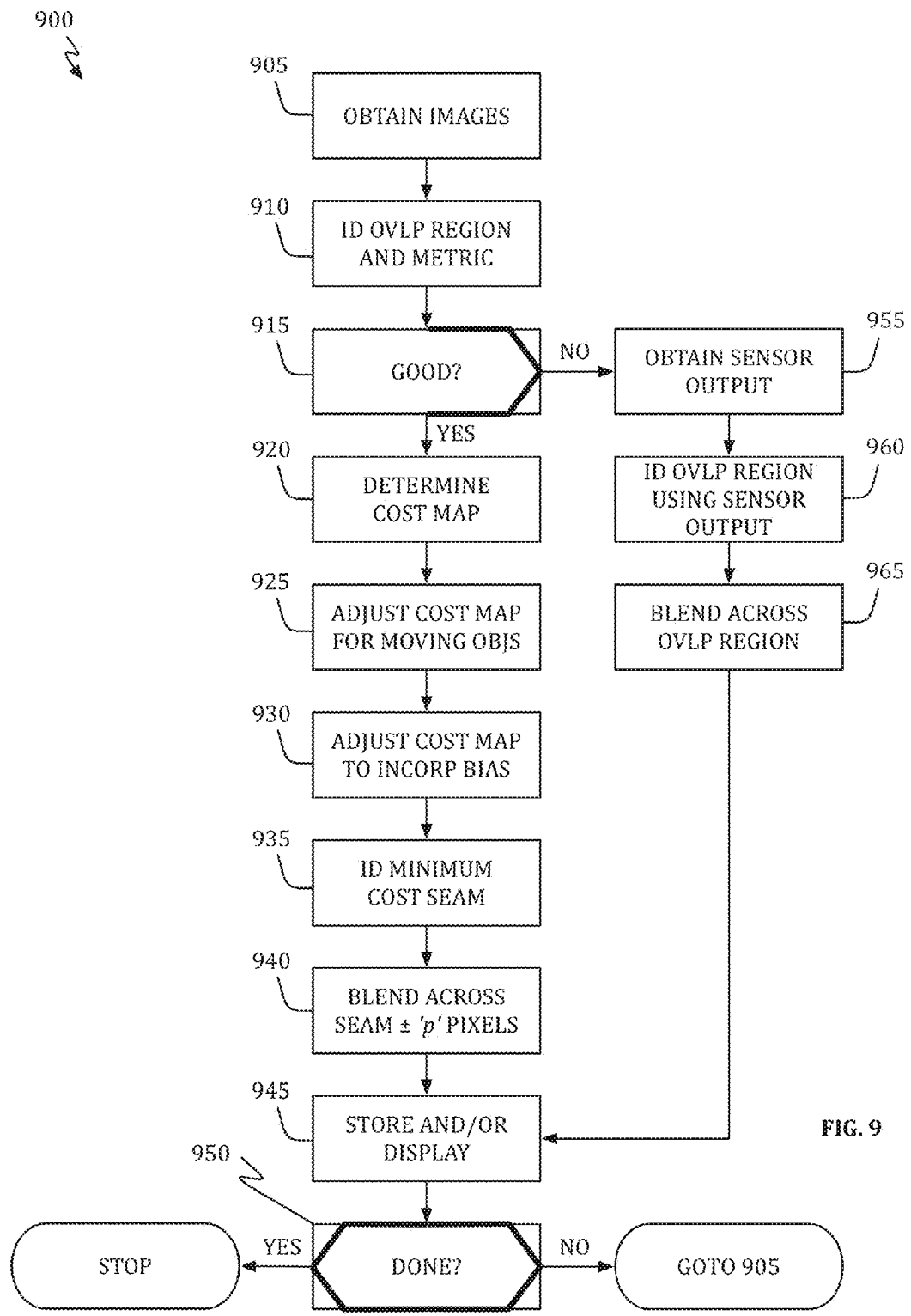
FIG. 9 shows, in flowchart form, a registration and blending operation in accordance with another embodiment.

Combining some of the various embodiments described herein, and referring to FIG. 9, registration and blending operation 900 begins when two images are obtained (block 905). In one embodiment, images may be obtained directly from an image capture device or sensor. In another embodiment, images may be obtained from a secondary source (e.g., storage). The two images may be registered to identify an overlap region and a quality metric (block 910). If the quality metric indicates the registration is acceptable (the "YES" prong of block 915), an initial cost map may be determined (block 920). The initial cost map may be adjusted to account for moving objects (block 925). One such adjustment may realize guard-band boundaries (e.g., see FIG. 3). The cost map may be further adjusted to bias seam selection to a vertical trajectory within the overlap region as discussed in accordance with FIGS. 7 and 8 (block 930). Based on the final cost map a minimum cost seam can be determined that may, or may not, incorporate seam continuity constraints as described above in accordance with EQS. 2 and 3 (block 935). The two images may then be blended together by blending ±'p' overlapping pixels across the identified minimum cost seam (block 940). While the precise guard-band width chosen is, of course, a design decision subject to the constraints and capabilities of the particular implementation, in one embodiment p maybe 32 to 64 pixels. It is of particular note that acts in accordance with block 940 do not need to use gradients making operation 900 amendable to real-time operations. It should be further noted that operation 900 identifies and compensates for moving objects within the overlap region while also selecting that seam that beneficially maintains the presentation of straight lines (edges) in the final output image. With blending operations complete, the blended image may be stored or displayed (block 945). If all desired images have been registered and blended (the "YES" prong of block 950), operation 900 is complete. If additional images remain to be combined (the "NO" prong of block 950), operation 900 continues at block 905 where the next image to be combined may be obtained.

Returning now to block 915, if the registration metric indicates the registration does not meet an acceptable threshold (the "NO" prong of block 915), sensor output may be obtained (block 955) and used to identify an overlap region between the images (block 960). By way of example, accelerometer and/or gyroscopic sensors associated with the image capture device may be used to estimate the amount of overlap between the images. Once this is done, the two images may be combined by being blended across the sensor-identified overlap region (block 965), where after operation 900 continues at block 945. In one embodiment, guard-band operations may not be employed (e.g., in accordance with block 925). In another embodiment, seam continuity constraints may not be applied (e.g., in accordance with block 935). In still another embodiment, the described bias seam-cut approach may not be implemented (e.g., in accordance with block 930).

Figure 10:
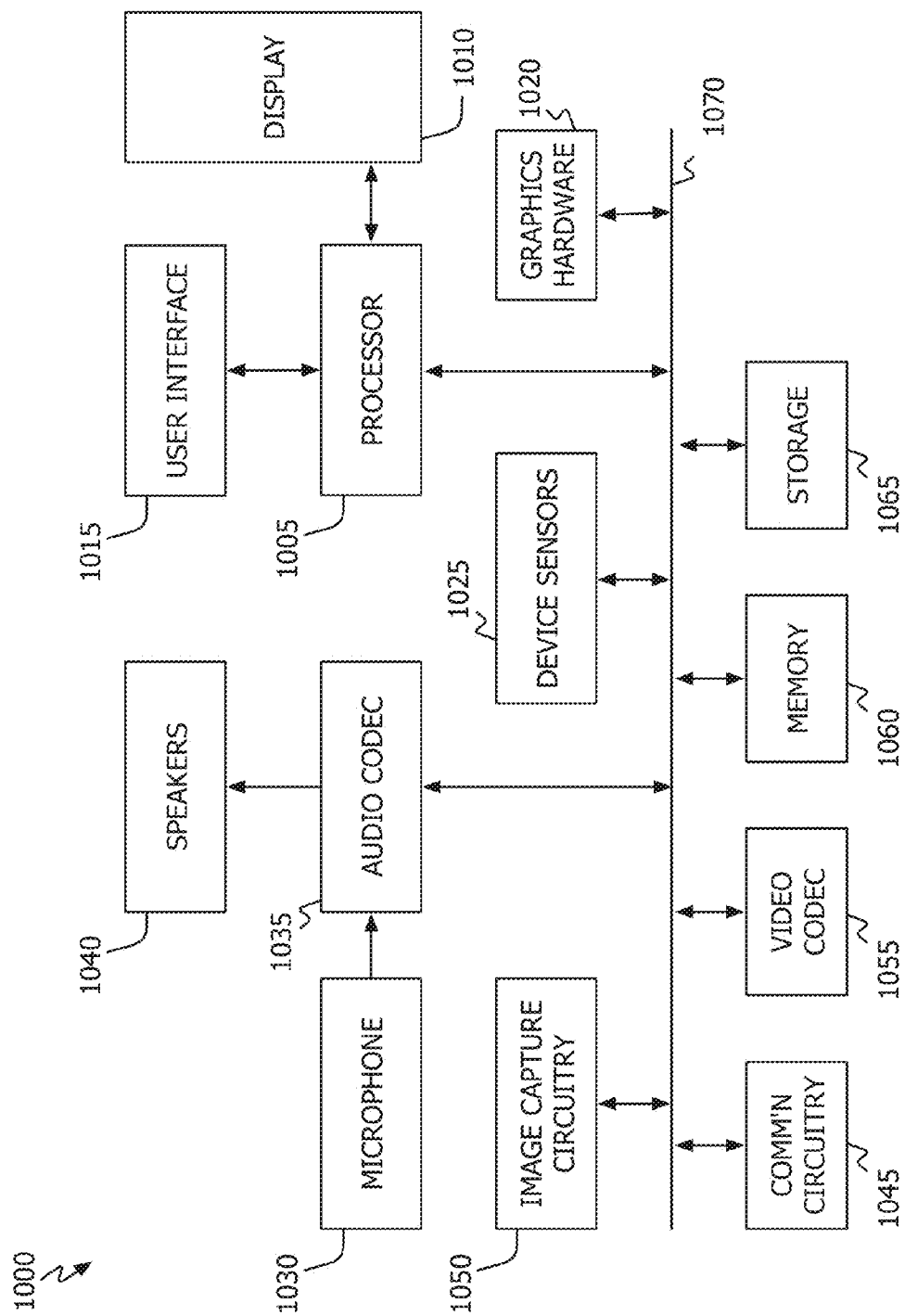
FIG. 10 shows, in block diagram form, an illustrative electronic device that may implement one or more of the described image blending operations.

Referring to FIG. 10, a simplified functional block diagram of an illustrative electronic device 1000 is shown according to one embodiment. Electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, digital image capture unit 1050, video codec(s) 1055, memory 1060, storage 1065, and communications bus 1070. Electronic device 1000 may be, for example, a personal digital assistant (PDA), personal music player, mobile telephone, or a notebook, laptop or tablet computer system.

Processor 1005 may execute instructions necessary to carry out or control the operation of many functions performed by device 1000 (e.g., such as the generation and/or processing of images in accordance with operations in any one or more of FIGS. 2-9). Processor 1005 may, for instance, drive display 1010 and receive user input from user interface 1015 which can take a variety of forms, such as a button, keypad, dial, a click wheel, keyboard, display screen and/or a touch screen. Processor 1005 may be a system-on-chip such as those found in mobile devices and include a dedicated graphics processing unit (GPU). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 process graphics information. In one embodiment, graphics hardware 1020 may include a programmable graphics processing unit (GPU).

Sensor and camera circuitry 1050 may capture still and video images that may be processed to generate wide angle-of-view images, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005, graphics hardware 1020, and image capture circuitry 1050 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to retain computer program instructions or code organized into one or more modules and written in any desired computer programming language. When executed by, for example, processor 1005 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
   obtain a first high-aspect ratio strip from a first image, the first high-aspect ratio strip having a plurality of pixels and a size, the size having a first dimension that is significantly greater than a second dimension;
   obtain a second high-aspect ratio strip from a second image, the second high-aspect ratio strip having a plurality of pixels and a size, the size having a first dimension that is significantly greater than a second dimension;
   obtain an overlap region between the first and second high-aspect ratio strips, the overlap region having a plurality of rows of pixels wherein each pixel in the overlap region has a corresponding pixel in each of the first and second high-aspect ratio strips;
   identify a seam through the overlap region, the seam having a plurality of values, each value corresponding to a pixel in a row of the overlap region;
   identify a guard band about the seam, the guard band extending a first number of pixels in a row to a first side and a second number of pixels in the row to a second side of each seam value, wherein the first and second number of pixels do not have to be the same number of pixels for each seam value;
   blend, in real-time and for each seam value, pixels from the first image and the corresponding pixels from the second image along each row of pixels in the overlap region within the identified guard-band to produce an output image; and
   store the output image in a memory.

2. The non-transitory program storage device of claim 1, wherein the instructions to cause the processor to identify a seam comprise instructions to cause the processor to apply a first filter to each pixel from the first high-aspect ratio strip in the overlap region and each corresponding pixel from the second high-aspect ratio strip to generate a first cost map, the first cost map having a plurality of values, one value for each pixel in the overlap region.

3. The non-transitory program storage device of claim 2, wherein the instructions to cause the processor to identify a guard band comprise instructions to cause the processor to apply a second filter to each of the plurality of values in the first cost map to generate a second cost map, the second cost map having a plurality of values, each value in the first cost map having a corresponding value in the second cost map, wherein the values in the second cost map identify the guard-band.

4. The non-transitory program storage device of claim 3, wherein the instructions to cause the processor to identify a seam further comprise instructions to cause the processor to identify a minimum cost path through the second cost map.

5. The non-transitory program storage device of claim 4, wherein the instructions to cause the processor to identify a seam further comprise instructions to cause the processor to enforce a continuity constraint on adjacent values of the minimum cost path.

6. The non-transitory program storage device of claim 3, wherein the instructions to cause the processor to apply a second filter further comprise instructions to cause the processor to apply a third filter to each value in the second cost map to generate a third cost map, the third filter adapted to increase each value in the second cost map based, at least in part, on a distance each value is from a specified path in the overlap region, each value so generated comprising one value in the third cost map, each value in the second cost map having a corresponding value in the third cost map.

7. The non-transitory program storage device of claim 6, wherein the instructions to cause the processor to identify a seam further comprise instructions to cause the processor to identify a minimum cost path through the third cost map.

8. The non-transitory program storage device of claim 7, wherein the instructions to cause the processor to identify a seam further comprise instructions to cause the processor to enforce a continuity constraint on adjacent values of the minimum cost path comprising the seam.

9. The non-transitory program storage device of claim 2, wherein the instructions to cause the processor to apply a first filter further comprise instructions to cause the processor to apply a second filter to each value in the first cost map to generate a second cost map, the second filter adapted to increase each value in the first cost map based, at least in part, on a distance each value is from a specified path in the overlap region, each value so generated comprising one value in the second cost map, each value in the second cost map having a corresponding value in the first cost map.

10. The non-transitory program storage device of claim 9, wherein the instructions to cause the processor to identify a seam further comprise instructions to cause the processor to identify a minimum cost path through the second cost map.

11. The non-transitory program storage device of claim 9, wherein the specified path comprises a path along a centerline of the overlap region.

12. The non-transitory program storage device of claim 1, further comprising instructions to cause the processor to display the output image on a display element.

13. The non-transitory program storage device of claim 1, wherein the instructions to cause the processor to obtain an overlap region further comprise instructions to cause the processor to obtain a registration quality value indicating a quality of the overlap region.

14. The non-transitory program storage device of claim 13, further comprising instructions to cause the processor to:
determine the registration quality value is less than a threshold value; and in response
identify a new overlap region based, at least in part, on motion sensor output.

15. An image blending method, comprising:
receiving, by a processor, an overlap region between a first high-aspect ratio strip from a first image and a second high-aspect ratio strip from a second image, each of the first and second high-aspect ratio strips having a plurality of pixels and a size, the size having a first dimension that is significantly larger than a second dimension, the overlap region having a plurality of rows of pixels wherein each pixel in the overlap region has a corresponding pixel in each of the first and second high-aspect ratio strips;
identifying, by the processor, a seam through the overlap region, the seam having a plurality of values, each value corresponding to a pixel in a row of the overlap region;
identifying, by the processor, a guard band about the seam, the guard band extending a first number of pixels in a row to a first side and a second number of pixels in the row to a second side of each seam value, wherein the first and second number of pixels do not have to be the same number of pixels for each seam value;
blending, by the processor, in real-time and for each seam value, pixels from the first high-aspect ratio strip and the corresponding pixels from the second high-aspect ratio strip along each row of pixels in the overlap region within the identified guard-band to produce an output image; and
storing, by the processor, the output image in a memory.

16. The method of claim 15, wherein the act of identifying a seam comprises applying, by the processor, a first filter to each pixel from the first high-aspect ratio strip in the overlap region and each corresponding pixel from the second high-aspect ratio strip to generate a first cost map, the first cost map having a plurality of values, one value for each pixel in the overlap region.

17. The method of claim 16, wherein the act of identifying a guard band comprises applying, by the processor, a second filter to each of the plurality of values in the first cost map to generate a second cost map, the second cost map having a plurality of values, each value in the first cost map having a corresponding value in the second cost map, wherein the values in the second cost map identify the guard-band.

18. The method of claim 17, wherein the act of identifying a seam, further comprises:
identifying, by the processor, a minimum cost path through the second cost map; and
enforcing, by the processor, a continuity constraint on adjacent values of the minimum cost path.

19. The method of claim 16, wherein the act of applying a first filter further comprises applying, by the processor, a second filter to each value in the first cost map to generate a second cost map, the second filter adapted to increase each value in the first cost map based, at least in part, on a distance each value is from a centerline path in the overlap region, each value so generated comprising one value in the second cost map, each value in the second cost map having a corresponding value in the first cost map.

20. The method of claim 15, wherein the act of receiving an overlap region further comprises obtaining, by the processor, a registration quality value indicating a quality of the overlap region.

21. The method of claim 20, further comprising:
determining, by the processor, if the registration quality value is at least a specified value; and
identifying, by the processor, a new overlap region based, at least in part, on motion sensor output when the registration quality value is less than the specified value.

22. An electronic device, comprising:
an image capture element;
a motion sensor element;
a memory operatively coupled to the image capture element;
a display element operatively coupled to the memory; and
a processor operatively coupled to the motion sensor element, the memory and the display element, wherein the memory further includes instructions to cause the processor to
obtain a first high-aspect ratio strip from a first image and a second high-aspect ratio strip from a second image, each high-aspect ratio strip having a plurality of pixels and a size, the size having a first dimension that is significantly greater than a second dimension,
identify an overlap region between the first and second high-aspect ratio strips, the overlap region having a plurality of rows of pixels wherein each pixel in the overlap region has a corresponding pixel in each of the first and second high-aspect ratio strips,
identify a seam through the overlap region, the seam having a plurality of values, each value corresponding to a pixel in a row of the overlap region,
identify a guard band about the seam, the guard band extending one or more pixels in a row to a first side and one or more pixels in the row to a second side of each seam value,
blend, for each seam value, pixels from the first high-aspect ratio strip and the corresponding pixels from the second high-aspect ratio strip along each row of pixels in the overlap region within the identified guard-band to produce an output image, and
store the output image in the memory.

23. The electronic device of claim 22, wherein the instructions to cause the processor to identify a guard band comprise instructions to cause the processor to:
apply a first filter to each pixel from the first high-aspect ratio strip in the overlap region and each corresponding pixel from the second high-aspect ratio strip to generate a first cost map, the first cost map having a plurality of values, one value for each pixel in the overlap region; and
apply a second filter to each of the plurality of values in the first cost map to generate a second cost map, the second cost map having a plurality of values, each value in the first cost map having a corresponding value in the second cost map, wherein the values in the second cost map identify the guard-band.

24. The electronic device of claim 23, wherein the instructions to cause the processor to identify a seam further comprise instructions to cause the processor to identify a minimum cost path through the second cost map.

25. The electronic device of claim 23, wherein the instructions to cause the processor to apply a second filter further comprise instructions to cause the processor to apply a third filter to each value in the second cost map to generate a third cost map, the third filter adapted to increase each value in the second cost map based, at least in part, on a distance each value is from a specified path in the overlap region, each value so generated comprising one value in the third cost map, each value in the second cost map having a corresponding value in the third cost map.

26. The electronic device of claim 25, wherein the instructions to cause the processor to identify a seam further comprise instructions to cause the processor to:
   identify a minimum cost path through the third cost map; and
   enforce a continuity constraint on adjacent values of the minimum cost path comprising the seam.

27. The electronic device of claim 22, wherein the instructions to cause the processor to identify a seam comprise instructions to cause the processor to:
   apply a first filter to each pixel from the first high-aspect ratio strip in the overlap region and each corresponding pixel from the second high-aspect ratio strip to generate a first cost map, the first cost map having a plurality of values, one value for each pixel in the overlap region;
   apply a second filter to each value in the first cost map to generate a second cost map, the second filter adapted to increase each value in the first cost map based, at least in part, on a distance each value is from a specified path in the overlap region, each value so generated comprising one value in the second cost map, each value in the second cost map having a corresponding value in the first cost map; and
   identify a minimum cost path through the second cost map.

28. The electronic device of claim 27, wherein the specified path comprises a path along a centerline through the overlap region.

29. The electronic device of claim 22, further comprising instructions to cause the processor to display the output image on the display element.

30. The electronic device of claim 22, wherein the instructions to cause the processor to identify an overlap region comprise instructions to cause the processor to obtain a registration quality value indicating a quality of the overlap region.

31. The electronic device of claim 30, further comprising instructions to cause the processor to:
   determine the registration quality value less than a threshold value; and, in response identify a new overlap region based, at least in part, on data from the motion sensor element.

32. A non-transitory program storage device, readable by a processor and comprising instructions stored thereon to cause the processor to:
   obtain first and second images, each having a first plurality of pixels;
   identify an overlap region between the first and second images, the overlap region having a second plurality of pixels, wherein each pixel in the overlap region has a corresponding pixel in the first image and a corresponding pixel in the second image;
   apply a first filter to each corresponding pair of pixels in the first and second images that are in the overlap region to generate a first cost map, the first cost map having one value for each pixel in the overlap region;
   apply a second filter to each value in the first cost map to generate a second cost map, wherein the second filter is adapted to create an area of lower values in the second cost map that are close to a moving object in the overlap region;
   identify a minimum cost path through the second cost map;
   blend, to generate a first output image, corresponding pairs of pixels from the first and second images corresponding to each value in the second cost map that is in an area of lower values created by the second filter;
   incorporate pixels from the first image that are in the overlap region, and not in an area of lower values created by the second filter, into the first output image;
   incorporate pixels from the first image that are not in the overlap region into the first output image;
   incorporate pixels from the second image that are in the overlap region, and not in an area of lower values created by the second filter, into the first output image;
   incorporate pixels from the second image that are not in the overlap region into the first output image; and
   store the first output image in a memory.

33. The non-transitory program storage device of claim 32, wherein the instructions to cause the processor to identify a minimum cost path comprise instructions to cause the processor to apply a continuity constraint between successive values of the minimum cost path.

34. The non-transitory program storage device of claim 32, wherein the instructions to cause the processor to apply a second filter further comprise instructions to cause the processor to apply a third filter to the second cost map to generate a third cost map, wherein the third filter is adapted to lower values from the second cost map that are toward a centerline of the overlap region when no moving object is present at a corresponding location in the first and second images.

35. The non-transitory program storage device of claim 34, wherein the instructions to cause the processor to identify a minimum cost path comprise instructions to cause the processor to apply a continuity constraint between successive values of the minimum cost path.

36. The non-transitory program storage device of claim 34, wherein the instructions to cause the processor to blend, to generate a first output image, corresponding pairs of pixels from the first and second images comprise instructions to cause the processor to alpha-blend corresponding pairs of pixels from the first and second images corresponding to each value in the second cost map that is in an area of lower values created by the second filter.

37. The non-transitory program storage device of claim 32, wherein the instructions to cause the processor to obtain first and second images comprise instructions to cause the processor to obtain a registration quality value.

38. The non-transitory program storage device of claim 37, wherein the instructions to cause the processor to identify an overlap region comprise instructions to cause the processor to:
   determine if the registration quality value is at least a specified value; and
   identify the overlap region based, at least in part, on motion sensor output when the registration quality values is less than the specified value.

* * * * *